United States Patent
Meng et al.

(10) Patent No.: US 7,092,922 B2
(45) Date of Patent: Aug. 15, 2006

(54) ADAPTIVE LEARNING ENHANCEMENT TO AUTOMATED MODEL MAINTENANCE

(75) Inventors: Zhuo Meng, Broadview Heights, OH (US); Baofu Duan, Cleveland Heights, OH (US); Yoh-Han Pao, Cleveland Heights, OH (US)

(73) Assignee: Computer Associates Think, Inc., Islandia, NY (US)

( * ) Notice: Subject to any disclaimer, the term of this patent is extended or adjusted under 35 U.S.C. 154(b) by 153 days.

(21) Appl. No.: 10/851,630

(22) Filed: May 21, 2004

(65) Prior Publication Data

US 2005/0033709 A1 Feb. 10, 2005

Related U.S. Application Data

(60) Provisional application No. 60/473,320, filed on May 23, 2003.

(51) Int. Cl.
 *G06E 1/00* (2006.01)
 *G06E 3/00* (2006.01)
 *G06F 15/18* (2006.01)
 *G06G 7/00* (2006.01)
 *G05B 13/02* (2006.01)

(52) U.S. Cl. .................. 706/16; 706/12; 706/14; 706/25; 706/31; 700/47; 700/48; 700/50; 703/4; 703/6

(58) Field of Classification Search ............ 706/12, 706/14, 15, 16, 25, 26, 31, 33, 42; 703/4, 703/6; 700/47, 48, 50; 365/200
See application file for complete search history.

(56) References Cited

U.S. PATENT DOCUMENTS

| | | | |
|---|---|---|---|
| 4,193,115 A | 3/1980 | Albus | |
| 4,215,396 A | 7/1980 | Henry et al. | |
| 4,438,497 A | 3/1984 | Willis et al. | |
| 4,649,515 A | 3/1987 | Thompson et al. | |
| 4,663,703 A | 5/1987 | Axelby et al. | |
| 4,670,848 A | 6/1987 | Schramm | |
| 4,740,886 A | 4/1988 | Tanifuji et al. | |
| 4,754,410 A | 6/1988 | Leech et al. | |
| 4,858,147 A | 8/1989 | Conwell | |
| 4,928,484 A | 5/1990 | Peczkowski | |
| 4,972,363 A | 11/1990 | Nguyen et al. | |
| 4,979,126 A | 12/1990 | Pao et al. | |
| 4,994,982 A | 2/1991 | Duranton et al. | |
| 5,023,045 A | 6/1991 | Watanabe et al. | |

(Continued)

FOREIGN PATENT DOCUMENTS

WO WO 2004/107264 A2 * 12/2004

OTHER PUBLICATIONS

Surajit Chaudhuri, Usama Fayyad and Jeff Bernhardt, "Scalable Classification over SQL Databases", *Proceedings of the 15th International Conference on Data Engineering*, Mar. 23-26, 1999, Sidney, Australia, pp. 470-479.

(Continued)

*Primary Examiner*—Ramesh Patel
(74) *Attorney, Agent, or Firm*—Baker Botts L.L.P.

(57) ABSTRACT

An adaptive learning method for automated maintenance of a neural net model is provided. The neural net model is trained with an initial set of training data. Partial products of the trained model are stored. When new training data are available, the trained model is updated by using the stored partial products and the new training data to compute weights for the updated model.

29 Claims, 5 Drawing Sheets

U.S. PATENT DOCUMENTS

| | | | |
|---|---|---|---|
| 5,052,043 | A | 9/1991 | Gaborski |
| 5,111,531 | A | 5/1992 | Grayson et al. |
| 5,113,483 | A | 5/1992 | Keeler et al. |
| 5,119,468 | A | 6/1992 | Owens |
| 5,140,523 | A | 8/1992 | Frankel et al. |
| 5,142,612 | A | 8/1992 | Skeirik |
| 5,175,678 | A | 12/1992 | Frerichs et al. |
| 5,175,797 | A | 12/1992 | Funabashi et al. |
| 5,212,598 | A * | 5/1993 | Kikuchi ..................... 359/823 |
| 5,247,445 | A | 9/1993 | Miyano et al. |
| 5,311,421 | A | 5/1994 | Nomura et al. |
| 5,335,291 | A | 8/1994 | Kramer et al. |
| 5,349,541 | A | 9/1994 | Alexandro et al. |
| 5,398,302 | A * | 3/1995 | Thrift .......................... 706/25 |
| 5,467,883 | A * | 11/1995 | Frye et al. .................... 216/60 |
| 5,485,390 | A | 1/1996 | LeClair et al. |
| 5,734,796 | A | 3/1998 | Pao |
| 5,812,992 | A | 9/1998 | de Vries ...................... 706/25 |
| 5,848,402 | A | 12/1998 | Pao et al. |
| 6,134,537 | A | 10/2000 | Pao et al. |
| 6,327,550 | B1 | 12/2001 | Vinberg et al. |
| 6,463,341 | B1 | 10/2002 | Cao et al. ..................... 700/48 |
| 6,829,598 | B1 * | 12/2004 | Milev .......................... 706/26 |
| 6,850,874 | B1 * | 2/2005 | Higuerey et al. .............. 703/4 |
| 6,941,287 | B1 * | 9/2005 | Vaidyanathan et al. ....... 706/12 |
| 2003/0055797 | A1 | 3/2003 | Ishihara ....................... 706/15 |
| 2004/0193558 | A1 * | 9/2004 | Nugent ........................ 706/25 |

OTHER PUBLICATIONS

Dennis T. Lee, Yoh-Han Pao and Dejan J. Sobajic "Dynamic System Control Using Neural Networks", pp. 25-30.

Yoh-Han Pao "Neural Net Computing For Patter Recognition" *Handbook of Pattern Recognition, and Computer Vision*, pp. 125-162 (edited by C.H. Chen, L.F. Pau and P.S.P. Wang).

Bernard Widrow, Narendra K. Gupta, and Sidhartha Maitra (Sep. 1973) "Punish/Reward: Learning With a Critic in Adaptive Threshold Systems", *IEEE Trans. Systems, Man and Cybernetics*, vol. SMC-3, No. 5, pp. 455-465.

John A. Hartigan, (1975) "Interpretation and Evaluation of Clusters", *Clustering Algorithms*, pp. 12-14.

Yoh-Han Pao and Dejan J. Sobajic (1987) "Metric Synthesis and Concept Discovery With Connectionist Networks", *1987 IEEE*, pp. 390-395.

Bernard Widrow and Rodney Winter (Mar. 1988) "Neural Nets for Adaptive Filtering and Adaptive Pattern Recognition", *IEEE Computer*, pp. 25-39.

Bernard Widrow, Rodney G. Winter, and Robert A. Baxter (Jul. 1988) "Layered Neural Nets for Pattern Recognition", *IEEE Trans. Acoustics, Speech, and Signal Processing*, vol. 36, No. 7, pp. 1109-1118.

Yoh-Han Pao, (1989) *Adaptive Pattern Recognition and Neural Networks*.

Andrew G. Barto (1990) "Connectionist Learning for Control", *Neural Networks for Control*, pp. 5-58 (edited by W. Thomas Miller, III, Richard S. Sutton and Paul J. Werbos).

R.D. Coyne and A.G. Postmus (1990) "Spatial Applications of Neural Networks in Computer-aided Design", *Artificial Intelligence in Engineering*, 5(1):9-22.

Kumpati S. Narendra and Kannan Parthasarathy (Mar. 1990) "Identification and Control of Dynamical Systems Using Neural Networks", *IEEE Trans. Neural Networks*, vol. 1, No. 1, pp. 4-27.

Maryhelen Stevenson, Rodney Winter, and Bernard Widrow (Mar. 1990) "Sensitivity of Feedforward Neural Networks to Weight Errors", *IEEE Trans. Neural Networks*, vol. 1, No. 1, pp. 71-80.

Esther Levin, Naftali Tishby, and Sara A. Solla (Oct. 1990) "A Statistical Approach to Learning and Generalization in Layered Neural Networks", *Proc. IEEE*, vol. 78, No. 10, pp. 1568-1574.

Les Atlas, Jerome Connor and Mark Damborg (1991) "Comparisons of Conventional Techniques and Neural Network in Computer-aided Design", Artificial Intelligence in Engineering, 5(1):9-22.

Miodrag Djukanov, Borivoje Babic, Dijan J. Sobajic and Yoh-Han Pao (1991) "Unsupervised/Supervised Learning Concept for 24-Hour Load Forcasting", *Artificial Intelligence in Engineering*, pp. 819-827.

M.M. Gupta and J. Qi (1991) "Fusion of Fuzzy Logic and Neural Networks with Applications to Decision and Control Problems", *Proceedings of the 1991 American Control Conference*, pp. 1:30-31.

Jocelyn Sietsma and Robert J. F. Dow (1991) "Creating Artificial Neural Networks That Generalize", *Neural Networks*, vol. 4, pp. 67-79.

Petros A. Ioannou and Aniruddha Datta (Dec. 1991) "Robust Adaptive Control: A Unified Approach", *Proc. IEEE*, vol. 79, No. 12, pp. 1736-1768.

S.A. Billings, H.B. Jamaluddin and S. Chen (1992) "Properties of neural networks with applications to modeling non-linear dynamical systems", *Int. J. Control*, pp. 55(1):193-224.

John Doleac, Jeff Getchius, Judy Franklin and Chuck Anderson (1992) "Nadaline Connectionist Learning vs. Linear Regression at a Lamp Manufacturing Plant", *Proceedings of The First IEEE Conference on Control Applications*, pp. 552-558.

William Finnoff, Ferdinand Hergert, and Hans Georg Zimmerman (1993) "Improving Model Selection by Nonconvergent Methods", *Neural Networks*, vol. 6, pp. 771-783.

Andreas Ikonomopoulos, Lefteri H. Tsoukalas and Robert E. Uhrig (1993) "A Hybrid Neural Networ-Fuzzy Arithmetic Methodology For Performing Virtual Measurements in a Complex System", *Proceedings of the Thirty-Sixth Power Instrumentation Symposium*, pp. 205-212.

Michael Nikolaou (1993) "Neural Network Modeling of Nonlinear Dynamical Systems", *Proceeding of the 1993 American Control Conference*, pp. 1460-1464.

Stevan V. Odri, Dusan P. Petrovacki, and Gorana A. Krstonosic (1993) "Evolutional Development of a Multilevel Neural Network", *Neural Networks*, vol. 6, pp. 583-595.

Yoh-Han Pao and Gwang-Hoon Park (1993) "Neural-Net Computing for Machine Recognition of Handwritten English Language text", *Fundamentals of Handwriting Recognition*, pp. 335-351.

Mujeeb M. Ahmed (1994) "An Integrated Approach to Distributed Intelligent Control", *Proceeding of the Thirty-Seventh Power Instrumentation Symposium*, pp. 1-15.

Timothy J. Graettinger, Naveen V. Bhat and Jeffrey S. Buck (1994) Adaptive Control with NeuCOP, the Neural Control and Optimization Package, *IEEE*, pp. 2389-2393.

Yoh-Han Pao (1994) "Process Monitoring and Optimization for Power Systems Applications", *IEEE International Conference on Neural Networks*, pp. 3697-3702.

Percy P.C. Yip and Yoh-Han Pao (1994) "A Guided Evolutionary Computation Technique as Function Optimizer",

*Proceeding of First IEEE Conference on Evolutionary Computation*, pp. 628-633.

Stuart J. Russell and Peter Norvig, (1995) "Learning From Observations", *Artificial Intelligence: A Modern Approach*, pp. 525-562.

Mattias Nyberg and Yoh-Han Pao (1995) "Automatic Optimal Design of Fuzzy Systems Based on Universal Approximation and Evolutionary Programming", *Fuzzy Logic And Intelligent Systems*, pp. 311-366 (edited by H.L. Hua and M. Gupta).

Percy P.C. Yip and Yoh-Han Pao (1995) "Combinatorial Optimization with Use of Guided Evolutionary Simulated Annealing", *IEEE Transaction on Neural Networks*, 6(2):290-295.

Yoh-Han Pao (1996) "Dimension Reduction Feature Extraction and Interpretation of Data With Network Computing", *International Journal of Patter Recognition and Artificial Intelligence*, pp. 10(5)521-253.

Yoh-Han Pao and Zhou Meng (1996) "A Perspective on Funtional-Link Computing, Dimension Reduction and Signal/Image Understanding", *Proceedings of 1996 IEEE Signal Processing Society Workshop*, pp. 213-222.

Michael J. A. Berry and Gordon Linoff, (1997) *Data Mining Techniques For Marketing, Sales and Customer Support*, Chapters 2, 5 and 12, pp. 17-35, 63-93 and 243-285.

Floriana Esposito, Donato Malerba and Giovanni Semeraro, (May 1997) "A Comparative Analysis Of Methods For Pruning Decision Trees", *IEEE Transaction on Pattern Analysis and Machine Intelligence*, 19(5):476-491.

Byung Hwan Jun, Chang Soo Kim, Hong-Yeop Song and Jaihie Kim, (Dec. 1997) "A New Criterion in Selection and Discretization of Attributes for the Generation of Decision Trees", *IEEE Transaction on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M. Fayyad and Cory A. Reina, (Jun. 1998) "Scaling Clustering Algorithms to Large Databases", Proc. 4th Int'l Conf. Knowledge Discovery & Data Mining, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J. A. Berry and Gordon Linoff, (2000) *Mastering Data Mining The Art and Science of Customer Relationship Management*, pp. 59-64 and 111-121.

Timo Koskela (2000) "Decision Trees", http://www.hut.fi/~timoko/treeprogs.html.

Zhou Meng and Yoh-Han Pao (2000) "Visualization and Self-Organization of Multidimensional Data through Equalized Orthogonal Mapping", IEEE Transaction on Neural Networks, pp. 11(4):1031-1038.

Notification of Transmittal of the International Search Report for application PCT/US2004/016177 (7 pages), Dec. 1, 2005.

Written Opinion of the International Searching Authority for application PCT/US2004/016177 (5 pages), Dec. 1, 2005.

XP-002354939, An Incremental Learning Method with Relearning of Recalled Interfered Patterns, Koichiro Yamaguchi, et al., pp. 243-252, 1996.

XP-002354940, A dynamic Neural Network Architecture by Sequential Partitioning of the Input Space, R. S. Shadafan, et al., 226-231, 1993.

* cited by examiner

Linear summation output

Linear weights

Non-linear functional-link layer

| | Train set | | Test set | | Number of Nodes |
|---|---|---|---|---|---|
| | Error | R-squared | Error | R-squared | |
| original | 4.58E-07 | 99.9977 | 490.565 | -2.45E+06 | 79 |
| updated with adaptive LS | 9.99E-05 | 99.5004 | 0.00022313 | 98.8843 | 113 |
| retrain with both sets | 9.64E-05 | 99.5179 | 0.00035061 | 98.2468 | 123 |

ADAPTIVE LEARNING ENHANCEMENT TO AUTOMATED MODEL MAINTENANCE

CROSS-REFERENCE TO RELATED APPLICATIONS

This application claims the benefit of commonly assigned provisional application Ser. No. 60/473,320, filed May 23, 2003 and entitled "ADAPTIVE LEARNING ENHANCEMENT TO AUTOMATED MODEL MAINTENANCE", which is incorporated in its entirety herein by reference.

TECHNICAL FIELD

This application relates to system modeling. In particular, the application relates to automated model maintenance.

DESCRIPTION OF RELATED ART

A neural net is useful in a wide range of applications.

For example, neural nets have gradually become a preferred approach for building a mathematical model of a system, especially when the dynamics of the system is unfamiliar and/or not well-defined, because neural net models are capable of providing universal approximation.

It is generally desirable for a neural net which is trained as a mathematical model of a system to be representative of the current dynamics of the system. However, since a neural net model is trained with a set of training data which represents specific samples of the system dynamics, the degree to which the model accurately represents the dynamics of the system cannot be better than that made available by the set of training data. The model's power of representation can be affected both by changes in system dynamics and by changes in the mode or domain of system operation. Both factors are more than likely to come into play for a real-world system.

Automated maintenance methodologies for adapting a system model to accommodate changes in the systems dynamics or to operational conditions need to be able to deal with both types of changes in order for the model to be useful and be able to provide optimal performance on a long-term basis.

Hidden layer nets with squashing node functions and back-propagation-of-error learning constitute one possible system modeling technique. However, selecting net parameters for an adaptive learning process for a hidden layer net is a rather delicate art. In addition, it has not been shown that automated maintenance of a hidden layer net model is possible.

Other adaptive learning techniques have been proposed. However, a common characteristic of conventional adaptive learning techniques is that a significant amount of newly available data is required before meaningful adaptive learning results can be expected. The requirement of a large pool of new data limits the expeditiousness of model update using conventional techniques. In addition, some conventional adaptive learning techniques consist essentially of training a new model using the newly available data and weights in the existing model but not the data used to train the existing model. Such techniques generally cannot achieve a level of training quality that can otherwise be obtained by training the net with a combined set of the original training data together with the new training data.

Therefore, there is need for improved automated model maintenance methodologies which can be used to update a system model expeditiously and can be used to update a system model when new data become available. The weights of the updated model is then a least-squares solution for the system model, trained to operate optimally in a task domain spanned by the composite of the old and new training data sets.

SUMMARY

The application provides an adaptive learning method for automated maintenance of an artificial neural-net model of the dynamics of a given system, operating in specified regions of task domain. In one embodiment, the method includes training a neural net model with an initial set of training data, storing partial products of the trained model, and updating the trained model by using the stored partial products and new training data to compute weights for the updated model. The new training data can include streaming data, and the method may be used to update the trained neural net model in real time with the streaming new training data.

The new updated model is formed without need for repeated use of the initial set of training data. The partial products of the previous training operation and the new set of data suffice to serve as the basis for formation of an updated system model, without need for explicit repeated use of the old original set of data. The updated model is of the nature of a least-squares solution to the task of learning a model of the system response to an input. The updated model is efficient in storage and in computation. There is no need to maintain storage of old data once they have been used in training, only condensations of that data, in the form of the partial products, need to be stored. The model is nevertheless an accurate least-squares solution of the composite set of data comprising both the old data and the new data.

BRIEF DESCRIPTION OF THE DRAWINGS

The features of the present application can be more readily understood from the following detailed description with reference to the accompanying drawings wherein.

DETAILED DESCRIPTION

A functional-link net with linear output nodes allows relatively simple adaptive learning to be carried out (as compared with, for example, hidden layer nets using squashing node functions with back-propagation-of-error learning). The functional-link net architecture together with the orthogonal functional-link net (OFLN) methodologies (which provide automatic determination of net structure) can be used for automated model creation and maintenance, and is described in U.S. application No. 60/374,020, filed 19, 2002 and entitled "AUTOMATIC NEURAL-NET MODEL GENERATION AND MAINTENANCE", which is incorporated in its entirety herein by reference. According to the OFLN methodologies, the weights are adjusted through a weighted average of the weights in the existing model and weights that fit the newly available data. However, determination of optimal scaling in a weighted average may be difficult in some instances. In addition, the original weights are the least-squares results of the original training data, and the new weights are the least-squares results of the new training data, but the weighted average results, even with optimal scaling, are worse than the least-squares results of training using a combined set of the original training data and new training data, in most instances.

Adaptive learning can also be carried out using local nets under some circumstances, which are described in U.S. application No. 60/373,977, filed Apr. 19, 2002 and entitled "AUTOMATIC MODEL MAINTENANCE THROUGH LOCAL NETS", which is incorporated in its entirety herein by reference.

The local nets technique can be used independent of net structure but is better suited for cases in which the newly available data are in a range different from the range of the original data with which an existing model was trained. When a local net is trained with data in a range that overlaps the range of the existing system model, the "memory" of the existing model is lost since the newly created local net overshadows the existing model and renders the existing model unavailable over the range of the local net.

This disclosure describes improved adaptive learning methodologies (referred to herein as "adaptive learning enhancement") for automated model maintenance which do not require a large collection of new data, and may be applied to update a system model with streaming new data. According to the adaptive learning enhancement of this application, some previously computed results in the form of partial products are stored and used for updating the model. The amount of storage space for storing partial products information depends on the size of the model, but not on the amount of the original data. Therefore, the adaptive learning enhancement is scalable to very large data sets. Since the adaptive learning enhancement can utilize any number of new patterns, it may be used to process streaming data for real time updates.

Figure 1:
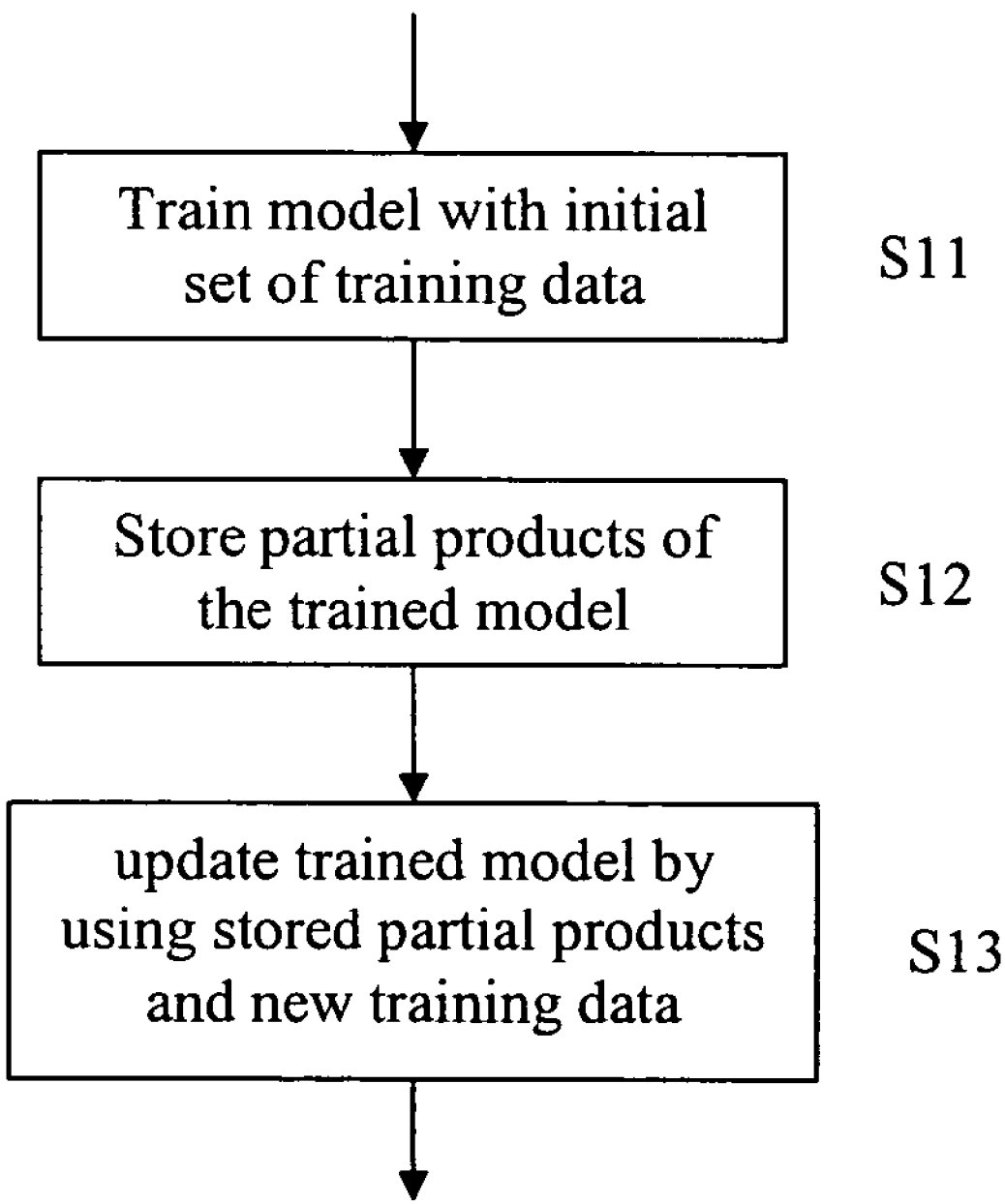
FIG. 1 shows a flow chart of a an adaptive learning method for automated maintenance of a neural net model, in accordance with one embodiment of the present application.

According to one embodiment (FIG. 1), an adaptive learning method for automated maintenance of a neural net model comprises training a neural net model with an initial set of training data (step S11), storing partial products of the trained model (step S12), and updating the trained model by using the stored partial products and new training data to compute weights for the updated model (step S13).

The partial products are a condensed representation of the data with which the existing model was trained, and can be used in combination with new training data to update the existing model expeditiously, such that the updated model appears to be trained using a combined set comprising the new training data and the original data used to train the existing model.

While the trained model is updated without using again the initial set of training data, the weights of the updated model are a least-squares solution for training the neural net model with a combined set consisting of (i) the new training data and (ii) the initial set of training data. An amount of stored partial products information of the trained model depends on the size of the neural net model but not on the size of the initial set of training data. Therefore, storage requirements are reduced, and model update can be performed expeditiously. The trained model may be updated by using the stored partial products along with a forgetting factor $\alpha$.

The neural net model preferably includes a functional link net, and the weights of the updated model are computed using an orthogonal least-squares technique. The method may further comprise determining a plurality of candidate functions, and selected ones of the candidate functions are used to create the functional link net model. The updated model may have more or less functional link nodes than the original trained model. The method may in addition include generating reserve candidate functions after the neural net model is trained, until a number of unused candidate functions reaches a predetermined threshold number. Selected ones of the unused candidate functions may be used to expand the functional link net model. The method may further comprise computing a least-squares error of the updated model. The least-squares error may be used to determine whether to continue or stop adding nodes from the candidate list.

The method may further comprise determining additional partial products by using the new training data, determining updated partial products for the updated model by using the stored partial products and the additional partial products, and storing the updated partial products. The method may in addition include updating further the updated model, when additional new training data become available, by using the additional new training data and the updated partial products.

According to one embodiment, the method may further comprise determining whether the new training data falls in a range of the initial set of training data, and creating one or more local nets by using the new training data, if the new training data does not fall in the range of the initial set of training data.

The method may be applied when the new training data include streaming data, to update the trained neural net model in real time with the streaming new training data. For example, the method may further comprise receiving streaming new training data, computing additional partial products corresponding to the streaming new training data, as the streaming data is collected, and computing the weights for the updated model by using the additional partial products corresponding to the streaming new training data.

The adaptive learning enhancement can be used to update the linear weights of a functional-link net to the true least-squares solution for the combined set of original data and newly available data, without a need to store and retain the original data. The adaptive learning enhancement can be used in combination with hierarchical clustering and modified orthogonal least-squares learning, to add new nodes and representational power to the net without sacrificing accuracy of the solution, and is suitable in situations in which a range of operations of the system remains approximately the same but newly available data provide more detail. In other circumstances, the adaptive learning enhancement may be used in conjunction with other adaptive learning techniques, such as local-net adaptive learning, as warranted by the characteristics of the new data as well as the state of the current model. The adaptive learning enhancement and local net adaptive learning, in combination, provide an effective and robust solution to the problem of automatic model maintenance.

The adaptive learning enhancement can be performed in place of the weight-adjusting technique on functional-link nets with linear output nodes. In contrast to other adaptive learning techniques which update an existing model without using the previously used data to train the existing model, the adaptive learning enhancement expeditiously combines newly available data with partial products which effectively represent the previously used training data, without a need to have available the body of previously used data. The set of newly computed weights of the updated model obtained from effectively combining the new data and the previously used data are the exact least-squares solution for the combined set of data, with the same node functions. The adaptive learning enhancement can be applied to update the model with new data even if the new data consists of only one new pattern. Therefore, the adaptive learning enhancement can be applied to a data stream (referred to herein as "stream adaptive learning") and can be carried out in real time as long as an amount of time for processing a largely fixed amount of computation is less than the time interval of the data stream.

Figure 2:
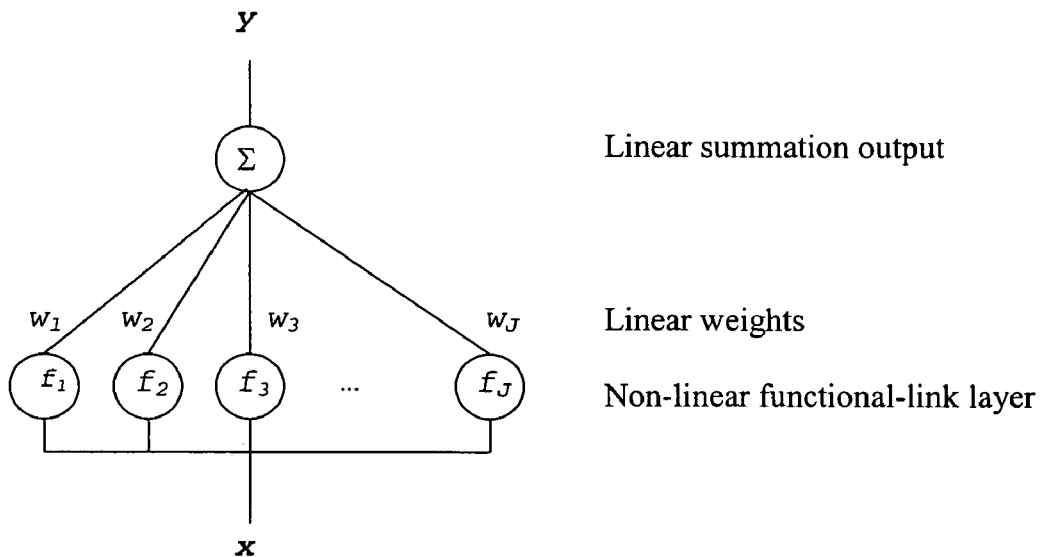
FIG. 2 shows a high-level schematic diagram of a functional-link net with a linear output node and non-linearity contained in the functional-link layer.

Stream adaptive learning, as applied through a least-squares technique to a functional-link net architecture, is discussed below. FIG. 2 shows the structure of a functional-link net with a linear output node and non-linearity fully contained in the functional-link layer.

A functional link net can be used to approximate any scalar function, such as the following, with a vector of inputs x and a scalar output y:

$$y = y(x) \tag{1}$$

Since a vector function can be decomposed into scalar dimensions and therefore can be approximated with multiple output nodes or multiple nets, the example of a single output node does not cause loss of generality.

One of the adaptive learning tasks is to improve the approximation of the scalar function y(x), given (i) a set of newly obtained associated pattern pairs $\{(x_q, y_q)\}$, wherein $q=1, \ldots, Q$, and (ii) an existing model constructed using a previously obtained set of pattern pairs $\{(x_p, y_p)\}$, wherein $p=1, \ldots, P$.

The linear sum of a set of non-linear basis functions, $f_j(x)$, wherein $j=1, \ldots, J$, can be used to represent, as illustrated in FIG. 2, an approximation of the function in Equation (1). This representation can be written as follows:

$$y(x) = \Sigma w_j f_j(x) \tag{2}$$

Equation (2) is an approximation. An error term may be added in addition on the right hand side to make it a true equality. The error term is dropped in the interest of clarity in the immediately following discussion. However, the issue of the error term will be revisited in the discussion further below.

Although radial basis functions such as Gaussians are frequently selected as $f_j(x)$ in Equation (2), other functions, such as sigmoids or wavelets, can also be used. When expressed in matrix term, Equation (2) can be rewritten as follows:

$$y = Fw \tag{3}$$

From the time the existing model is created, the F matrix contains the outputs of the J functional-link nodes for the original P patterns and has the size P×J. The output y, which is a P×1 matrix, contains the predicted values output by the model for the P patterns. The weights w of the net, which is a J×1 matrix for a single output, corresponds to the least-squares solution of Equation (3), which can be obtained by solving the following system of linear equations:

$$F^t y = (F^t F) w \tag{4}$$

According to one adaptive learning technique, a least-squares solution of Equation (3) is obtained for a combined set of previously used training data and newly obtained data. The least-squares solution corresponds to a net structure trained with the entire combined set. Using $F_p$ to denote the part of F matrix resulting from the previously obtained set of data, $F_q$ to denote the part of F matrix resulting from the newly obtained set of data (containing Q patterns) and similar representations for y, Equation (3) for this case can be expressed equivalently as follows:

$$\begin{bmatrix} y_p \\ y_q \end{bmatrix} = \begin{bmatrix} F_p \\ F_q \end{bmatrix} w' \tag{5}$$

$F_p$ is of size P×J, $F_q$ is of size Q×J, $y_p$ is of size P×1, $y_q$ is of size Q×1, and w' remains of size J×1 but contains weights fit for the combined data set. The least-squares solution of w' of Equation (5) can be obtained using the following process:

$$[F_p^t \ F_q^t] \begin{bmatrix} y_p \\ y_q \end{bmatrix} = [F_p^t \ F_q^t] \begin{bmatrix} F_p \\ F_q \end{bmatrix} w' \tag{6}$$

By multiplying out the parts of the matrices, Equation (6) can be transformed as follows:

$$F_p^t y_p + F_q^t y_q = (F_p^t F_p + F_q^t F_q) w' \tag{7}$$

By comparing Equation (7) and Equation (4), it is evident that in order to solve the system of linear equations in Equation (7), either $F_p$, $F_q$, $y_p$ and $y_q$ (or equivalently the previously and newly obtained data) must be available, or alternatively, partial products $F_p^t F_p$ and $F_p^t y_p$ can be stored and only newly obtained data are required. While the sizes of F and y depend on the number of available patterns, the sizes of partial products $F_p^t F_p$ and $F_p^t y_p$ are J×J and J×1 respectively, and therefore depend only on the size of the net (i.e. the number of nodes). Therefore, expenditure of storage space is less of a concern when partial products are stored as compared to storage of the original patterns. In addition, storing the partial products can save the time of computing them again.

According to the stream adaptive learning methodologies, partial products are stored for carrying out adaptive learning. Adaptive learning using the partial products yields an exact least-squares solution of the system dynamics learning task based on information supplied by a combined set of previously used data and newly available data.

For circumstances where system dynamics continue to evolve with time, it may be useful to be able to allocate greater importance to new data than to old data. This can be done with use of a forgetting factor α, with a value in the interval [0.0, 1.0] Incorporating the forgetting factor α into Equation (7), Equation (8) may be obtained as follows:

$$(1-\alpha) F_p^t y_p + F_q^t y_q = ((1-\alpha) F_p^t F_p + F_q^t F_q) w' \tag{8}$$

As the value of α increases, the contribution of the existing patterns diminishes. The value of α can be chosen to balance between the rate of change of data and the rate of change in the system dynamics. The introduction of α also provides an opportunity to learn how fast the system evolves. If one can optimize the value of α based on minimizing errors in model output, by monitoring the history of α values, one can estimate the change characteristics of the system and that may also provide guidance for more efficient selection of future α values.

Solving Equation (8) with new data only requires availability of partial products, which can be computed from the training data in one pass. There is no restriction on the number of newly available patterns since the sizes of $F_q{}^t F_q$ and $F_q{}^t y_q$ are also J×J and J×1, respectively, and are independent of the number of patterns. Therefore, stream adaptive learning is extremely suitable for processing real-time updates to the model. Since an amount of time for solving Equation (8) for w' is dependent only on the net structure and therefore is more or less constant, as long as the machine which processes the update is fast enough so that the amount of time for computing a new set of weights w' is less than the data acquisition time interval, real-time updating of the weights can be achieved.

While any technique for solving a system of linear equations, such as Gaussian Elimination, Lu Decomposition and so on, can be used to solve Equation (8) the orthogonal least-squares (OLS) methodology provides useful characteristics of importance in the present context. For example, with OLS, it is easy to make incremental changes in the number of nodes used in the model. This is an important and useful trait of the methodology. For example, for some circumstances, an updated model (updated with newly available data) it might be appropriate for a data-updated model to have a smaller number of functional-link nodes than the original model. On the other hand, stream adaptive learning also allows for expansion to be reserved by making the size of the $F_p{}^t F_p$ matrix larger than warranted by the actual number of nodes in the net These matters can be achieved relatively simply in the context of the OFLN technique as discussed herein below. The capability of modifying net structure for stream adaptive learning is in contrast to other adaptive learning techniques for which modifications of net structure would be difficult to achieve.

Since summation of partial products is carried out before Equation (8) can be solved (for w'), the form of the equation reduces to the form of Equation (4) and notations in Equation (4) are used in the discussion herein below.

In order to apply the OLS methodology to Equation (4), the OLS methodology is adapted from its original form to apply to Equation (3). The modified procedure can be represented as follows $$F = HA \quad (9)$$

and $$y = Fw = HAw = Hg \quad (10)$$

The columns of H are orthogonal, and therefore $H^t H$ is diagonal, and A is an upper-triangular matrix with ones on its diagonal. The H and A matrices can be constructed using the Gram-Schmidt method, with which the other non-zero elements of A can be represented as follows:

$$a_{ij} = <f_i h_j>/<h_j h_j> \quad (11)$$

wherein i>j and "< >" denotes an inner-product operation. With $a_{11}=1$, $h_1=f_1$, the following is true:

$$<f_1 h_1> = <h_1 h_1> = (F^t F)_{11} \quad (12)$$

The inner-products can be computed recursively as follows $$<f_i h_j> = (F^t F)_{ij} - \sum_{k=1}^{j-1} a_{jk} <f_i h_k> \quad (13)$$

and $$<h_j h_j> = <f_j h_j> = (F^t F)_{jj} - \sum_{k=1}^{j-1} a_{jk} <f_j h_k> \quad (14)$$

By applying a pseudo-inverse to Equation (10), the elements of vector g can be represented as follows:

$$g_j = <h_j y>/<h_j h_j> \quad (15)$$

In addition, by applying the following:

$$<h_1 y> = <f_1 y> = (F^t y)_1 \quad (16)$$

the numerator of Equation (15) can be recursively computed as follows:

$$<h_j y> = (F^t y)_j - \sum_{k=1}^{j-1} a_{jk} <h_k y> \quad (17)$$

The inverse of the A matrix, which can be computed as before, together with the g vector can finally determine the values of the weights w.

It is shown hereinabove that the weights can be determined through remembering partial products $F^t F$ and $F^t y$, by using the OLS technique. In addition, a limitation may be placed on the number of functional-link nodes which are added from a list of candidates in actual implementation, based on computation of least-squares errors. Putting the dropped error term back into Equation (10) and rearranging the terms, the vector of pattern error may be determined as follows:

$$e = y - Hg \quad (18)$$

And the least-squares error may be determined as follows:

$$E = <e\ e> = <y\ y> - <y\ (Hg)> - <(Hg)\ y> + <(Hg)(Hg)> \quad (19)$$

The last three terms on the right-hand side of Equation (19) are equal to one another due to the least-squares property and therefore the two of them cancel each other. Keeping the middle one of the three terms for convenience, and using matrix format, Equation (19) can be simplified to the following:

$$E = y^t y - g^t H^t y \quad (20)$$

Since g and $H^t y$ can be computed from Equations (15) and (17), the least-squares error can be computed by storing $y^t y$. The size of $y^t y$, like the other partial products also does not depend on the number of patterns but only on the number of outputs of the net.

According to the modified OLS technique, as discussed above, once the functional-link candidates are determined, the OLS process for solving for the weights w and for computing least-squares error E does not distinguish whether the training is to create an initial model or to adapt an existing model. The initial values of partial products $F^t F$, $F^t y$, and $y^t y$ can be set to 0 for model creation. The modified OLS technique is advantageous as compared to the original OLS technique which works directly on F, because the modified OLS implementation automatically has adaptive learning capability. Since the values of the partial products can be computed with one pass of data, the modified OLS technique can achieve adaptive learning of a data stream.

There is at least one difference between the creation of a model and adapting an existing model which is not related to the OLS technique. For the creation of a model, before the OLS technique is applied, a list of functional-link candidates is generated during which unsupervised learning is carried out first and therefore access to the data is needed. Stream learning is not used for creating a model (independent of the modified OLS process which does not limit stream learning), if a list of candidate functions is not available. However, as long as a list of candidate functions is available, stream learning can be carried out, and more specifically adaptive learning can be achieved using the process illustrated in FIG. 3.

Figure 3:
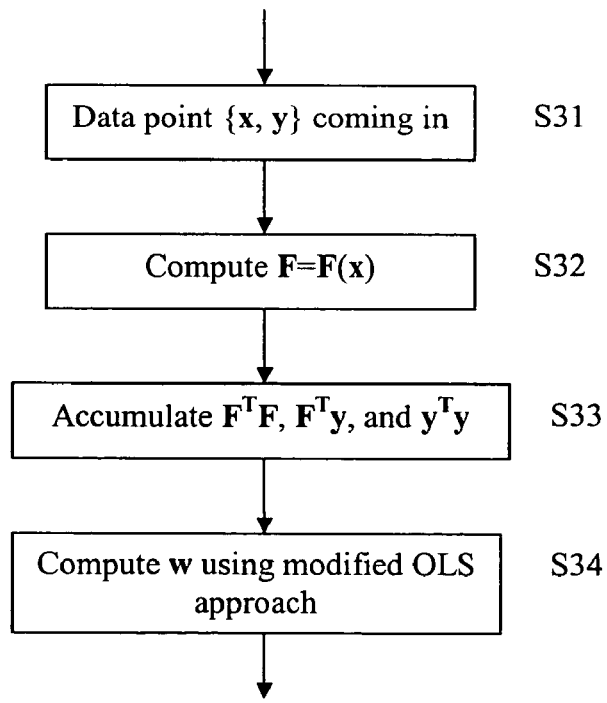
FIG. 3 shows a flow chart of a stream learning process which uses a modified orthogonal least-squares technique.

A summary of the stream adaptive least-squares learning process using a modified OLS technique is illustrated in FIG. 3. Data points {x, y} are collected as they are received (step S31). At an appropriate time, such as when the data stream ends or pauses, the F matrix is computed based on the collected data (step S32). Next, partial products $F^t F$, $F^t y$ and $y^t y$ are determined (step S33), and then weights w are computed by using the modified OLS technique (step S34).

There is one restriction for carrying out stream adaptive learning. The list of candidate functions is fixed during the adaptive learning. However, it is the list of candidate functions, not the net structure, that is fixed during adaptive learning. Under some circumstances, adaptive learning may result in a net structure that has less nodes than the original net. The updated net can have more nodes than before, as long as the list of candidate functions has not been exhausted originally.

By using the OFLN technique, a sufficient list of candidate functions can be prepared in advance. The OFLN technique utilizes hierarchical K-means clustering to generate a list of candidate functions. The parameters of the candidate functions are derived from the locations of cluster centers and the spread or 'radii' of the functions. Functions may be added sequentially from the list of candidates since configuration of the clustering eliminates a need to carry out forward selection, which may otherwise be necessary.

Figure 4:
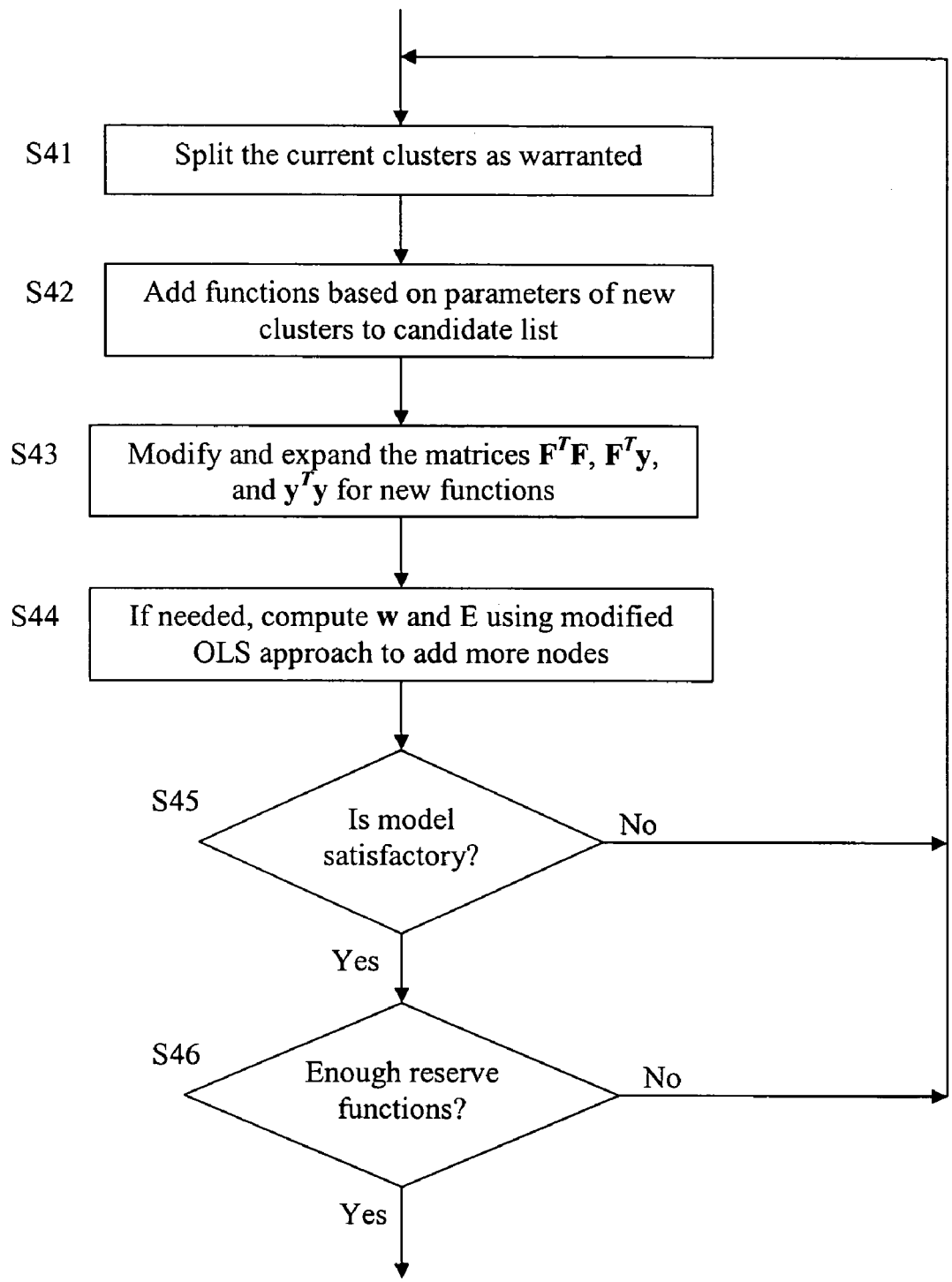
FIG. 4 shows a flow chart of a process for creating an initial model, according to one embodiment.

FIG. 4 shows a summary of a process for creating an initial model and preparing reserve functions for adaptive learning later. Reserve candidate functions may be generated by carrying out one or more additional levels of clustering in addition to the levels of clustering for satisfying the training target (for example, leaf clusters may be split into smaller clusters) (step S41). Additional functions are evaluated based on parameters of the new clusters (step S42), and the new functions are used to expand or fill in the matrices $F^t F$, $F^t y$, and $y^t y$, in order to pave the way for more effective adaptive learning afterwards (step S43). In practice, a threshold in terms of a certain percentage of the number of nodes, which were used to build the initial net, can be used to guide the generation of reserve candidate functions.

Next, weights w and error E may be computed using the modified OLS technique (step S44). At the point where the initial model is satisfactory (step S45, Yes), the number of unused candidate functions can be examined to see if it already exceeds the threshold (step S46). If the number of unused candidate functions exceeds the threshold (step S46, Yes), the initial model creation process stops. If the number of unused candidate functions has not reached the threshold (step S46, No) or if the model is not yet satisfactory (step S45, No), one or more levels of additional clustering can be carried out (step S41) to generate more candidate functions until the model is satisfactory or the threshold is exceeded.

The parameters of clustering may be configured to control the number of new clusters to be generated, based on a number of additional reserve functions for reaching the threshold, in order that addition of the reserve functions does not greatly reduce the efficiency of the initial training. For example, if the number of additional reserve functions to be added to reach the threshold is small, the biggest leaf clusters may be further split into smaller ones, rather than splitting all leaf clusters.

Another advantage of the procedure illustrated in FIG. 4 is that the process to generate candidate functions through clustering is incremental and can be integrated with the construction of the net thus enhancing the implementation of automatic clustering complexity control. In contrast, according to conventional radial basis net techniques, the kernel functions are generated in advance.

Once the initial model is created, further adaptive learning can be carried out according to a process illustrated in FIG. 3. In contrast to creation of an initial model, adaptive learning can be applied to a data stream.

The use of reserve functions allows the net to expand as warranted during stream adaptive learning while achieving least-squares results for the effectively combined training set. The newly available data, however, generally must be in the same range as existing data, when radial basis functions are used as node functions. When the list of candidate functions is generated, selected candidate functions are placed according to where the data are. Since a radial basis function is local in nature, i.e. its value approaches zero as distances go to infinity, regions in which there are no functions simply cannot be approximated.

However, local net adaptive learning, which is described in U.S. Application No. 60/373,977, entitled "AUTOMATIC MODEL MAINTENANCE THROUGH LOCAL NETS", can be applied when new data falls in a range which is not covered by the functions. Local net adaptive learning is suited, for example, for situations in which the new data points fall into systems space domains and data ranges different from those of the original data.

Figure 5:
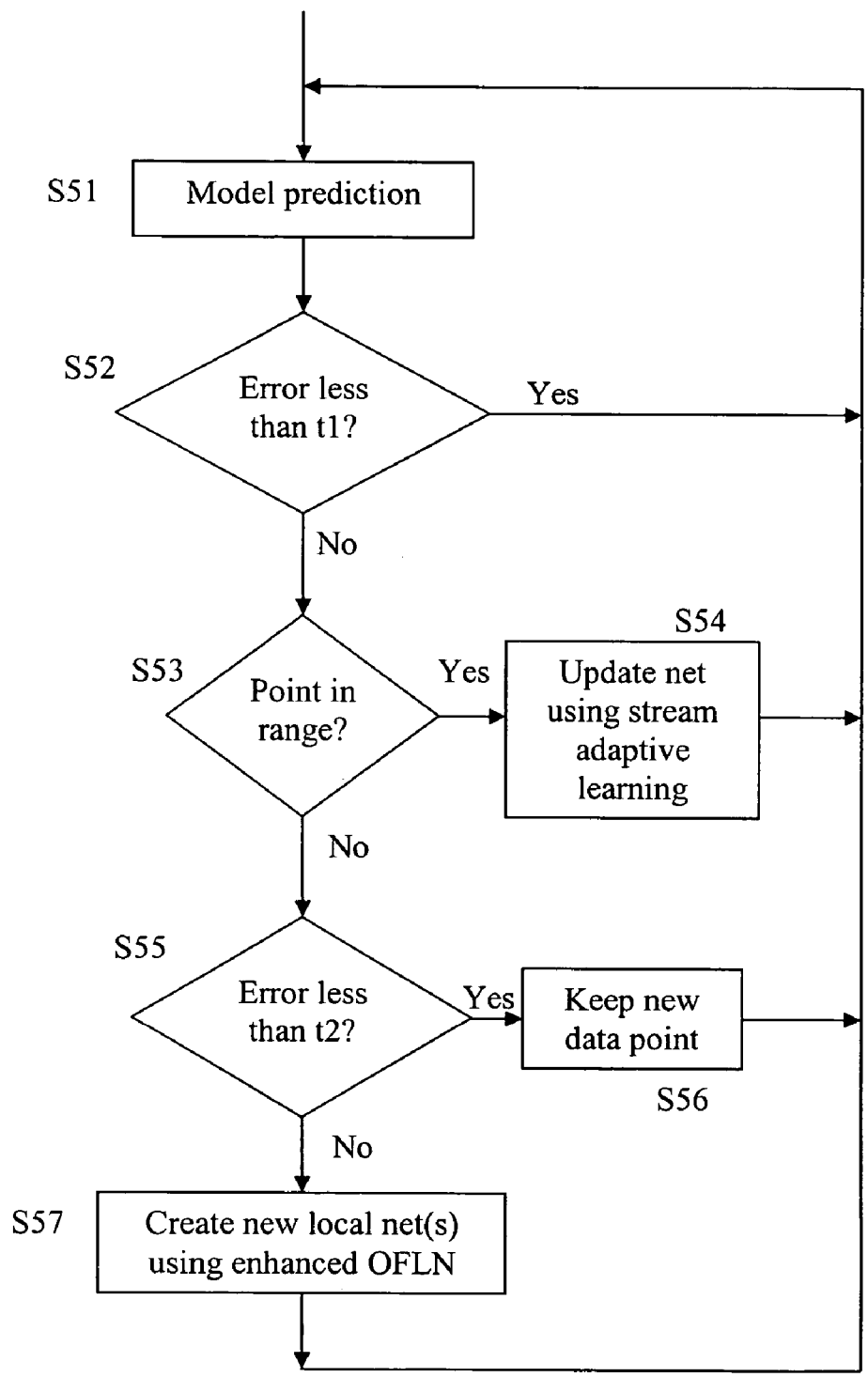
FIG. 5 shows a flow chart of a process for automatic model maintenance, according to one embodiment, which combines the improved adaptive learning methodologies of this application and local net adaptive learning.

A process combining stream adaptive learning and local net adaptive learning to achieve robust automatic model maintenance is described below, with reference to FIG. 5.

When a new data point is passed through the model to obtain a model prediction (step S51), an error of the prediction is compared to a threshold t1 (step S52). If the error is less than the threshold t1 (step S52, Yes), the model is not updated. Otherwise, it is determined whether the data point is within the range of the model (step S53). In a case in which the model is created through OFLN methodologies and is composed of radial basis functions, it is easy to determine if a new data point falls inside the range of the model by examining the centers and radii. For new data points inside the range of the model (step S53, Yes), stream adaptive learning can be invoked to update the model (step S54). If the new data points fall outside the range of the model (step S53, No) and the error is less than a threshold t2 (step S55, Yes), the new data point is stored (step S56). If the new data points fall outside the range of the model (step S53, No) and the error has reached the threshold t2 (step S55, No), a local net can be established to cover the new region (step S57). The local net can be created using OFLN with modified OLS technique and therefore can streamadaptively be updated using new data points falling into its range. The combination of the two techniques, which have complementary effects, provides a robust solution to automatic model maintenance. FIG. 5 illustrates a combined adaptive solution which uses a double threshold scheme as described in application No. 60/373,977.

The following simple example of 2-D (two-dimensional) function approximation is provided for illustrative purposes to demonstrate the effectiveness of stream adaptive learning with reserve node functions. We suppose the function to be approximated is of the following form:

$$z=\sin(5\,\pi x)\cos(5\,\pi y) \quad (21)$$

wherein x and y are in the interval [0.0, 1.0]. A 3-D plot of the function in Equation (21) is provided in FIG. 6.

The original training set is constructed by sampling on a set of grid points. For both x and y coordinates, the grid points are selected with a step of 0.125 starting from 0. This results in a total of 81 points in the original training set. In order to illustrate the use of reserve functions, the clustering configuration used in creating the initial model was obtained through binary split at each level and clustering all the way to single member clusters. Using OFLN with modified OLS methodology, the initial model was created using 79 nodes with 99 additional reserve functions. For this example, due to a limited number of patterns, selective splitting of clusters mentioned previously was not carried out and thus a seemingly large number of reserve functions was obtained. Also, the OFLN technique utilizes all clusters in the cluster hierarchy as they are generated (as opposed to only the leaf clusters), which caused the total number of candidate functions to be larger than the number of training patterns for this extreme case of configuration.

Figures 6, 7:
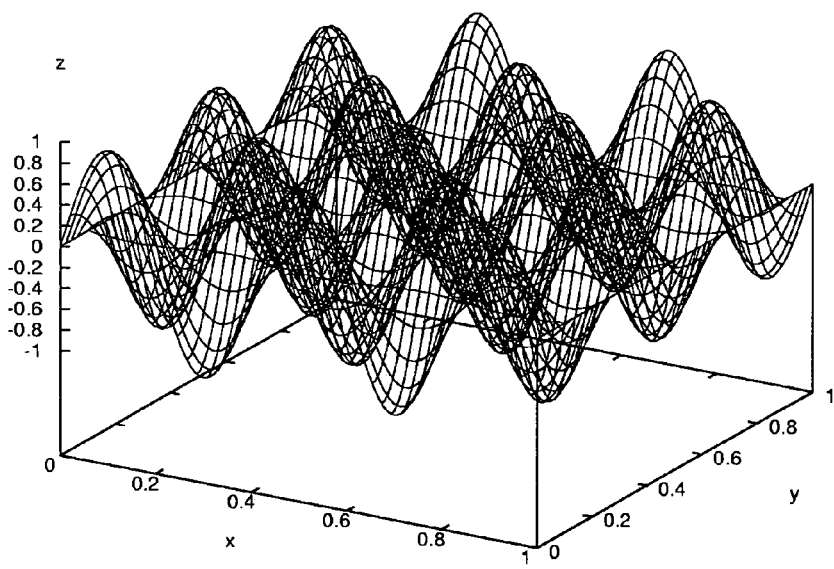
FIG. 6 shows a plot of an exemplary function (Equation 21 below)
FIG. 7 shows a table of results using adaptive least-squares learning in connection with the example corresponding to FIG. 6.

FIG. 7 summarizes the results [of modeling Equation (21)]. The target training error was 1e-4 in all cases. The resulting training error and the ANOVA $R^2$ values for the initial training set appear to be excellent. In order to test the model performance, a much finer grid was used to create a test set. The step size used was 0.01 for both x and y coordinates. The performance of this seemingly good model over the test set was however very poor, as also shown in FIG. 7. The grid used to generate the original training set was perhaps not fine enough and therefore failed to capture some peak positions.

Using the same step value of 0.125 but with an alternative starting value of 0.0625 for both x and y coordinates, a second training set of 64 patterns was constructed for the purposes of adaptive learning. The second training set also misses some peak positions but the two sets complement each other and together they capture all the peak positions. A total of 34 reserve functions were added in the process using stream adaptive least-squares learning, and the updated model therefore contained 113 nodes. As shown in FIG. 7, the third row, the updated model performed well for the test set.

For comparison purposes, the two training sets were combined together and used to create a new model. The training and testing results of the new model are shown as the last row in FIG. 7. The performance of the updated model is comparable with the performance of the new model, and the updated model even outperformed the new model on the test set. The slight difference in performance is due to a difference in clustering since data in both sets were used in clustering for creating the new model, but only data points in the first set were used for the original model. The difference is also reflected in the different numbers of nodes in the updated model and in the new model, respectively.

The weight update technique of adaptive learning fails for a case of severe under-specification, because neither of the two data sets independently contains nearly enough detail for the problem. When modeling is based on each of the data sets individually, each model introduces large errors in regions in which information is missing. Since such regions complement each other in the two sets for this case, a weighted average causes the model to be inaccurate for all regions that miss information in either of the two sets.

The adaptive learning enhancement to automatic model maintenance described in the present disclosure uses stored partial products obtained from applying an original set of training data, to adaptively update the model with new data, without using the previously used training data, and obtains the result that the weights of the updated model are a least-squares solution for the combined set of previously used data and new training data. The sizes of the partial products are dependent on the size of the model, but not on the number of patterns in the training data set. As discussed above, a forgetting factor can be used to leverage an amount of history which is retained depending on the characteristics of change in the system to be modeled. The adaptive learning enhancement can be performed with only one pass of data and can be carried out with as few as one new pattern, such as when data is streaming. Therefore, stream adaptive learning is highly scalable.

When adaptive least-squares learning is combined with local net adaptive learning, according to the adaptive learning enhancement of this disclosure, the combination can provide an effective and robust solution to the problem of automatic model generation and maintenance. On the one hand, one or more new local nets can be established for data points which fall into previously unknown regions. On the other hand, each local net in the combined solution can be created and adaptively updated using adaptive least-squares learning enhancement for novel data points which fall inside known regions of the local net.

Additional applications of the adaptive learning enhancement are possible. For example, many computer application software employ system model methodologies to provide the application with abilities similar to human pattern recognition and predictive skills. For some of these applications, new data may be available periodically (or sporadically) for updating the system model. The following are just a few examples in which application software can be adapted with pattern recognition, predictive or other intelligent skills through system modeling and the model is updated by applying the adaptive learning enhancement.

A retailer periodically needs to determine the amount of merchandise to be ordered from a supplier in order to avoid running out of inventory in the upcoming month, while not keeping too much inventory (for example, above what is needed for the month). Enterprise resource planning software may include means for modeling the dynamics of the retail business and for making predictions of future sales, based on recent sales, current inventory, historical trend, etc. For example, the model may be trained to reflect seasonal buying patterns (such as during holiday seasons) through historical data. However, the dynamics of the retail business may change and therefore the model may require update. In addition, many factors (for example, weather, economic conditions, etc.) may cause a deviation from historical patterns in a particular season. Streaming data may be collected and used to update the model for the season, in order to adapt to the changed conditions affecting the system.

The adaptive learning enhancement also maybe applied to, for example, profiling (which is known in the information technology art as "data mining"), to look for interesting data patterns in a system and, for example, associate them with (as an effect of) a cause or (as a cause of) an effect. For example, a model of consumer buying tendencies may be developed through training with a set of consumer profile data maintained by an eBusiness application for a selected group of consumers. After the original model is established, consumer buying tendencies may change as a result of many factors, such as fashion trends, expectations affected by improving technology, etc. Therefore, the model may need to be periodically updated or even updated with streaming new data as the data is collected.

As another example, utilization of resources in an enterprise information system may vary according to assorted factors (or combination of factors), such as time (for example, hour of day, day of week, or month of year, etc.), user or group, resource, etc. A model for allocating enterprise system resources may be developed based on historical resource utilization patterns. However, the original model may need to be updated, if, for example, new technologies such as wireless network interfaces are introduced into the enterprise resource pool, after the existing model is developed. System resource utilization differs substantially when wireless network interfaces are available as compared to when only conventional network interfaces are available. In addition, the changes occur, not immediately, but over a period of time. Therefore, resource utilization data may be collected dynamically, and used to update the model in order to account for changes to utilization patterns caused by the availability of the new technology.

As yet another example, a value prediction model may be trained for business intelligence to model market prices for a commodity, such as electric power. In the electric power business, managers of a local utility may decide on a daily basis which electric plants are run in production, and how much power to buy or sell on the market, based on forecasts of the next day's demand and price. These decisions may be made on an hour-by-hour basis for the following day, and therefore forecasts are desired for each hour of the following day. A model may be trained to predict the next day's hourly demand for electric power based on the outdoor temperature and actual demand in the previous 24 hours. Adaptive updates may be required after the production process is changed, for example, to comply with new environmental regulations, which cause associated changes to production outputs, costs, etc. In addition, since the predictive ability must be updated based on new data as soon as possible, use of streaming new data is closer to being a requirement than an option, and therefore stream adaptive learning is appropriate and preferred.

The above specific embodiments are illustrative, and many variations can be introduced on these exemplary embodiments without departing from the spirit of the disclosure or from the scope of the appended claims. For example, elements and/or features of different illustrative embodiments may be combined with each other and/or substituted for each other within the scope of this disclosure and appended claims.

Additional variations may be apparent to one of ordinary skill in the art from reading the following U.S. applications, which are incorporated in their entireties herein by reference:

(a) Ser. No. 60/374,064, filed Apr. 19, 2002 and entitled "PROCESSING MIXED NUMERIC AND/OR NON-NUMERIC DATA";

(b) Ser. No. 10/418,659, filed Apr. 18, 2003 and entitled "PROCESSING MIXED NUMERIC AND/OR NON-NUMERIC DATA";

(c) Ser. No. 60/374,020, filed Apr. 19, 2002 and entitled "AUTOMATIC NEURAL-NET MODEL GENERATION AND MAINTENANCE";

(d) Ser. No. 10/374,406, filed Feb. 26, 2003 and entitled "AUTOMATIC NEURAL-NET MODEL GENERATION AND MAINTENANCE";

(e) Ser. No. 60/374,024, filed Apr. 19, 2002 and entitled "VIEWING MULTI-DIMENSIONAL DATA THROUGH HIERARCHICAL VISUALIZATION";

(f) Ser. No. 10/402,519, filed Mar. 28, 2003 and entitled "VIEWING MULTI-DIMENSIONAL DATA THROUGH HIERARCHICAL VISUALIZATION";

(g) Ser. No. 60/374,041, filed Apr. 19, 2002 and entitled "METHOD AND APPARATUS FOR DISCOVERING EVOLUTIONARY CHANGES WITHIN A SYSTEM";

(h) Ser. No. 10/412,993, filed Apr. 14, 2003 and entitled "METHOD AND APPARATUS FOR DISCOVERING EVOLUTIONARY CHANGES WITHIN A SYSTEM";

(i) Ser. No. 60/373,977, filed Apr. 19, 2002 and entitled "AUTOMATIC MODEL MAINTENANCE THROUGH LOCAL NETS";

(j) Ser. No. 10/401,930, filed Mar. 28, 2003 and entitled "AUTOMATIC MODEL MAINTENANCE THROUGH LOCAL NETS";

(k) Ser. No. 60/373,780, filed Apr. 19, 2002 and entitled "USING NEURAL NETWORKS FOR DATA MINING";

(l) Ser. No. 10/418,671, filed Apr. 18, 2003 and entitled "USING NEURAL NETWORKS FOR DATA MINING".

What is claimed is:

1. An adaptive learning method for automated maintenance of a neural net model, comprising:
   training a neural net model with an initial set of training data, the neural net model having one or more original weights associated with the neural net model;
   storing partial products of the trained model, the partial products comprising a portion of the initial training set of training data and a new set of training data; and
   updating the trained model by using the stored partial products and new training data to compute adjusted weights for the updated model.

2. The method of claim 1, wherein the adjusted weights of the updated model are a least-squares solution for training the neural net model with a combined set consisting of (i) the new training data and (ii) the initial set of training data.

3. The method of claim 1, wherein an amount of information corresponding to the partial products of the trained model depends on the size of the neural net model but not on the size of the initial set of training data.

4. The method of claim 1, wherein the trained model is updated by using the stored partial products along with a forgetting factor $\alpha$.

5. The method of claim 1, wherein the neural net model includes a functional link net.

6. The method of claim 5, wherein the weights of the updated model are computed using an orthogonal least squares technique.

7. The method of claim 5, wherein the updated model has more functional link nodes than the trained model.

8. The method of claim 5, further comprising computing a least-squares error of the updated model.

9. The method of claim 5, wherein the updated model has less functional link nodes than the trained model.

10. The method of claim 5, further comprising:
determining a plurality of candidate functions,
wherein selected ones of the candidate functions are used to create the functional link net model.

11. The method of claim 10, further comprising generating reserve candidate functions after the neural net model is trained, until a number of unused candidate functions reaches a predetermined threshold number.

12. The method of claim 11, wherein selected ones of the unused candidate functions are used to expand the functional line net model.

13. The method of claim 5, further comprising:
determining whether the new training data falls in a range of the initial set of training data; and
creating one or more local nets by using the new training data, if the new training data does not fall in the range of the initial set of training data.

14. The method of claim 1, further comprising:
determining additional partial products by using the new training data;
determining updated partial products for the updated model by using the stored partial products and the additional partial products; and
storing the updated partial products.

15. The method of claim 14, further comprising updating further the updated model, when additional new training data become available, by using the additional new training data and the updated partial products.

16. The method of claim 1, wherein the new training data includes streaming data, and the method is used to update the trained neural net model in real time with the streaming new training data.

17. The method of claim 1, further comprising:
receiving streaming new training data;
computing additional partial products corresponding to the new training data; and
computing the weights for the updated model by using the additional partial products corresponding to the new training data.

18. A computer system for automated maintenance of a neural net model, comprising:
a memory operable to store partial products of a neural net model, the partial products comprising a portion of an initial training set of training data and a new set of training data; and
a processor coupled to the memory and operable to:
train the neural net model with an initial set of training data, the neural net model having one or more original weights associated with the neural net model; and
update the trained neural net model by using the stored partial products and new training data to compute adjusted weights for the updated model.

19. The system of claim 18, wherein the adjusted weights of the updated model are a least-squares solution for training the neural net model with a combined set consisting of (i) the new training data and (ii) the initial set of training data.

20. The system of claim 18, wherein the trained model is updated by using the stored partial products along with a forgetting factor $\alpha$.

21. The system of claim 18, wherein the neural net model includes a functional link net.

22. The system of claim 21, wherein the weights of the updated model are computed using an orthogonal least squares technique.

23. The system of claim 21, wherein the updated model has more functional link nodes than the trained model.

24. The system of claim 21, further comprising:
determining a plurality of candidate functions,
wherein selected ones of the candidate functions are used to create the functional link net model.

25. The system of claim 24, further comprising generating reserve candidate functions after the neural net model is trained, until a number of unused candidate functions reaches a predetermined threshold number.

26. The system of claim 18, further comprising:
determining additional partial products by using the new training data;
determining updated partial products for the updated model by using the stored partial products and the additional partial products; and
storing the updated partial products.

27. The system of claim 26, further comprising updating further the updated model, when additional new training data become available, by using the additional new training data and the updated partial products.

28. Logic for automated maintenance of a neural net model, the logic encoded in a medium and operable to:
train a neural net model with an initial set of training data, the neural net model having one or more original weights associated with the neural net model;
store partial products of the trained model, the partial products comprising a portion of the initial training set of training data and a new set of training data; and
update the trained model by using the stored partial products and new training data to compute adjusted weights for the updated model.

29. A computer data signal transmitted in one or more segments in a transmission medium which embodies instructions executable by a computer to:
train a neural net model with an initial set of training data, the neural net model having one or more original weights associated with the neural net model;
store partial products of the trained model, the partial products comprising a portion of the initial training set of training data and a new set of training data; and
update the trained model by using the stored partial products and new training data to compute adjusted weights for the updated model.

* * * * *